United States Patent
Kurupati

(10) Patent No.: US 10,715,548 B2
(45) Date of Patent: Jul. 14, 2020

(54) DETECTING DEVICE MASQUERADING IN APPLICATION PROGRAMMING INTERFACE (API) TRANSACTIONS

(71) Applicant: Akamai Technologies, Inc., Cambridge, MA (US)

(72) Inventor: Sreenath Kurupati, Sunnyvale, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 114 days.

(21) Appl. No.: 15/784,532

(22) Filed: Oct. 16, 2017

(65) Prior Publication Data

US 2018/0109559 A1 Apr. 19, 2018

Related U.S. Application Data

(60) Provisional application No. 62/409,240, filed on Oct. 17, 2016.

(51) Int. Cl.
*H04L 29/06* (2006.01)

(52) U.S. Cl.
CPC ...... *H04L 63/1466* (2013.01); *H04L 63/0876* (2013.01); *H04L 63/1425* (2013.01)

(58) Field of Classification Search
CPC ............. H04L 63/0876; H04L 63/1466; H04L 63/1425
See application file for complete search history.

(56) References Cited

U.S. PATENT DOCUMENTS

| | | |
|---|---|---|
| 7,447,184 B1 | 11/2008 | Kharvandikar et al. |
| 9,424,422 B2 | 8/2016 | Osis et al. |
| 2007/0183375 A1 | 8/2007 | Tiwari et al. |
| 2010/0269175 A1 | 10/2010 | Stolfo et al. |
| 2011/0271342 A1 | 11/2011 | Chung et al. |
| 2012/0216282 A1 | 8/2012 | Pappu et al. |
| 2013/0198203 A1* | 8/2013 | Bates ............... G06Q 30/02 707/748 |

(Continued)

OTHER PUBLICATIONS

PCT/US2017/056964 International Search Report and Written Opinion dated Mar. 9, 2018, 13 pages.

*Primary Examiner* — Baotran N To
(74) *Attorney, Agent, or Firm* — David H. Judson

(57) ABSTRACT

This disclosure describes a technique to determine whether a client computing device accessing an API is masquerading its device type (i.e., pretending to be a device that it is not). To this end, and according to this disclosure, the client performs certain processing requested by the server to reveal its actual processing capabilities and thereby its true device type, whereupon—once the server learns the true nature of the client device—it can take appropriate actions to mitigate or prevent further damage. To this end, during the API transaction the server returns information to the client device that causes the client device to perform certain computations or actions. The resulting activity is captured on the client computing and then transmitted back to the server, which then analyzes the data to inform its decision about the true client device type. Thus, when the server detects the true client device type (as opposed to the device type that the device is masquerading to be), it can take appropriate action to defend the site.

16 Claims, 3 Drawing Sheets

(56) References Cited

U.S. PATENT DOCUMENTS

2013/0254885 A1 9/2013 Devost et al.
2014/0344927 A1* 11/2014 Turgeman ............ H04W 12/06
　　　　　　　　　　　　　　　　　　　　726/22

* cited by examiner

DETECTING DEVICE MASQUERADING IN APPLICATION PROGRAMMING INTERFACE (API) TRANSACTIONS

BACKGROUND

Technical Field

This application relates generally to protecting websites and mobile applications (apps) from automated attacks by scripts or bots.

Brief Description of the Related Art

Computer systems often provide application programming interfaces or "APIs" to allow client computers to access services/resources. For instance, consider the scenario where a user is logging into his or her banking website. The user enters his login/password on the web browser on his home personal computer (PC). The login/password is sent from the client browser to the remote web server, typically as an API transaction. The web server authenticates the user and provides a response back. When clients access APIs in this manner, they typically communicate their device type. For instance, in a web transaction the client sends its device type, typically by sending a user-agent on a Hypertext Transport Protocol (HTTP) header.

One challenge here is that a fraudulent hacker accessing this API can send an arbitrary user-agent to pretend/masquerade its true device type. As an example, consider the case where a mobile device (e.g., a mobile phone) accesses a mobile API server. A hacker may programmatically access the API, e.g., by using an emulator/script/bot program, to masquerade as a real phone. A similar scenario can occur with web applications. Once the hacker obtains access to the server in this manner, it is able to undertake various attacks that damage the site, extract user data, and so forth.

BRIEF SUMMARY

This disclosure describes a technique to determine whether a client computing device accessing an API is masquerading its device type (i.e., pretending to be a device that it is not). To this end, and according to this disclosure, the client performs certain processing requested by the server to reveal its actual processing capabilities and thereby its true device type, whereupon—once the server learns the true nature of the client device—it can take appropriate actions to mitigate or prevent further damage. To this end, during the API transaction the server returns information to the client device that causes the client device to perform certain computations or actions. The resulting activity is captured on the client computing and then transmitted back to the server, which then analyzes the data to inform its decision about the true client device type. Thus, when the server detects the true client device type (or, at the very least, that the device type that the device is masquerading to be is not correct), it can take appropriate action to defend the site.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

As will be seen, the server participating in the API transaction detects a device masquerading its device type by exploiting the notion that client-side devices have different performance characteristics based on their underlying hardware and supporting software. For instance, a high-end computing device can run programs much faster than, say, a mobile device with less computing resources (e.g., a mobile phone, tablet, wearable, an Internet of Things (IOT) device, etc.). The technique herein thus exploits this notion by causing the requesting client (namely, the device participating in the API transaction and representing itself with a device type) to collect device performance statistics, and then to send those performance statistics to the server. Preferably, this performance data collection and transmission is done on the client in an automated manner as part of the client-server API transaction (e.g., using Javascript, a mobile SDK, or the like) such that the client provides the data in a transparent manner. Once that data is received, the server then analyzes it (e.g., against known performance statistics from other computing devices) to detect whether the client device is hiding or obfuscating its true nature, namely, by masquerading its device type. If so, one or more actions (e.g., mitigation, monitoring, etc.) are carried out using known bot mitigation techniques and methods. The server can also detect the client's real device type from the device performance statistics received.

As an example, consider the case where a hacker is running a brute force password attack on a mobile web-page. To facilitate this attack, the hacker runs a headless browser/script on a high end compute machine and tests numerous login/passwords. To ensure the script does not get flagged as a non-mobile client, the hacker's script sends a fake user agent corresponding, for instance, to a low-end mobile phone. The detection technique of this disclosure automatically detects this scenario, preferably by collecting statistics on the run-time of various functions on the client device. For instance, a function that is supposed to run at a best case of 10 ms on a mobile phone typically runs much faster on a high-end computer device. By comparing the actual statistic with the expected statistic for the client device, masquerading is detected and then ameliorated.

Figure 1:
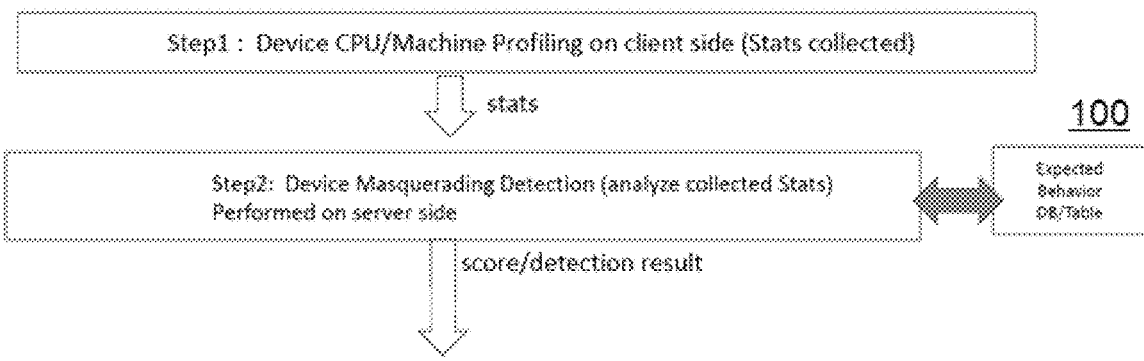
FIG. 1 depicts a process flow of the device type masquerade detection scheme of this disclosure.

FIG. 1 depicts the basic operation. At step 1, performance statistics are collected with respect to a central processing unit (CPU) or other machine characteristics of the client device. The nature of the machine characteristics of course may vary depending on what characteristics (e.g., storage, memory, I/O, etc.) can be accessed by the testing. In a web application context, the client is caused to collect such statistics by scripting routines (e.g., Javascript) that are served by the server (as part of the API transaction) and thus are executed on a client web browser. In the context of a native mobile applications, the statistics can be collected by application code (or by an SDK) in the native application. Preferably, the performance statistics involve collecting a runtime for one or more functions, which can vary. Without limitation, these functions are: (1) collecting a time taken by the CPU to run a loop with N additions; (2) collecting a time taken by the CPU to run a loop with N subtractions; (3) collecting the time taken by the CPU on various operations (multiply, divide, logical operators, other complex mathematical operations such as sine, cosine, log, floating-point computes, still other operations such as graphical processing unit (GPU) computes, system calls, etc.); (4) collecting the time taken by the CPU to run combinations of such operations, etc. As an alternative computational strategy to running loops with fixed counts, a fixed time budget instead can be allocated and the number of operations that are possible within that time budget is collected for analysis by the server. As an alternative or in addition to such computational loops, complex functions (e.g., the time taken for encryption/compression) are run and the relevant performance data or statistics collected. As yet another alternative or addition to the examples above, the time taken for existing application code can be collected. For instance, when a user visits a web page, Javascripts functions are executed on the web page as part of the user experience/interactions. Time counters placed in the Javascript code then measure the time taken for these functions. The same can be done for code executing in a native mobile application. The above are merely representative examples, as the notion here is that the client device is manipulated (typically by one or more scripts returned during the API transaction by the server that receives the original client request) to execute various computational or other "local" activities on the client that are then representative of the client's true device type.

At step (2), and after the performance statistics have been delivered to the server, the server performs a device masquerading detection function. To this end, typically the server analyzes the collected statistics to determine whether the statistics received are possible based on the device type that the client claims to be. To perform this checking, in this embodiment the server stores or can access a table or database 100 of expected behavior for a given device. For instance, the table may contain multiple rows, where each row contains a device type and the typical time taken for various functions. The incoming statistics from step (1) are compared with the time that is typically expected and that is represented in the database. When the actual statistics are close enough to the expected behavior (e.g., within a given configurable threshold), then the device may be treated as benign. When, however, the statistics deviating from the expected behavior (one again according to some configurable threshold), then device masquerading is suspected and a score indicating the same can be provided (e.g., by way of an alert). To save storage costs and complexity, preferably the table of expected behavior is not necessarily required to keep expected behavior for all devices types but perhaps for only a subset. In such case, interpolation can then be done to get expected behavior for devices for which explicit table entries are not present. For instance, instead of storing expected behavior for models 1, 2, 3 . . . N of a given manufacturer, the behavior for only a few models may be stored and interpolation used to get expected behavior for other devices. As an alternative or in addition to checking whether the absolute values of the statistics are in an expected range, relative expectation formulas can be built. For instance, a particular device might use a CPU which supports specialized instructions. In such case, the ratio of time taken (as opposed to absolute time) between certain functions can serve as useful data point in determining whether device masquerading is or is not occurring. Once again, any useful computational heuristic may be utilized to facilitate the device masquerade detection.

FIGS. 2-5 represent various operating scenarios, and these scenarios should be taken as merely exemplary and non-limiting.

Figure 2:
FIG. 2 depicts a first operating embodiment in which the described technique is implemented.

FIG. 2 represents a typical use case wherein the statistics collections occurs on the requesting client device 200, and detection is carried out by the server 202 that is participating with the client in the API transaction. As has been described, performance statistics (or other client-side machine characteristics) are collected on the client device. For a web application this is typically done using Javascript that is returned to the client, e.g., during an initial portion of the API transaction or transaction setup. For a mobile native application (sometimes just referred to as app), this is done using a mobile SDK/app code (iOS/Android/Windows). The collected statistics are sent to the API-based server 202 and analyzed there to detect device masquerading.

Figure 3:
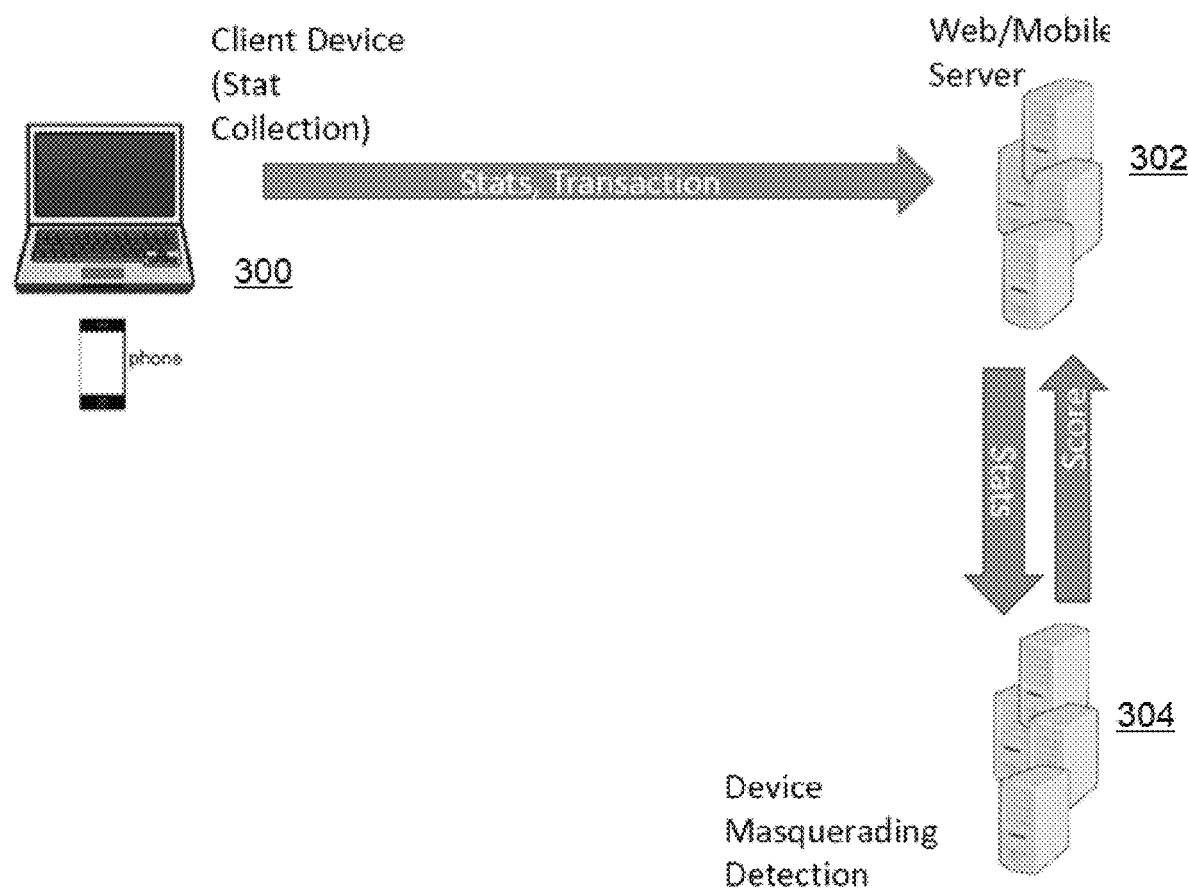
FIG. 3 depicts a second operating embodiment in which the technique is implemented.
Figure 4:
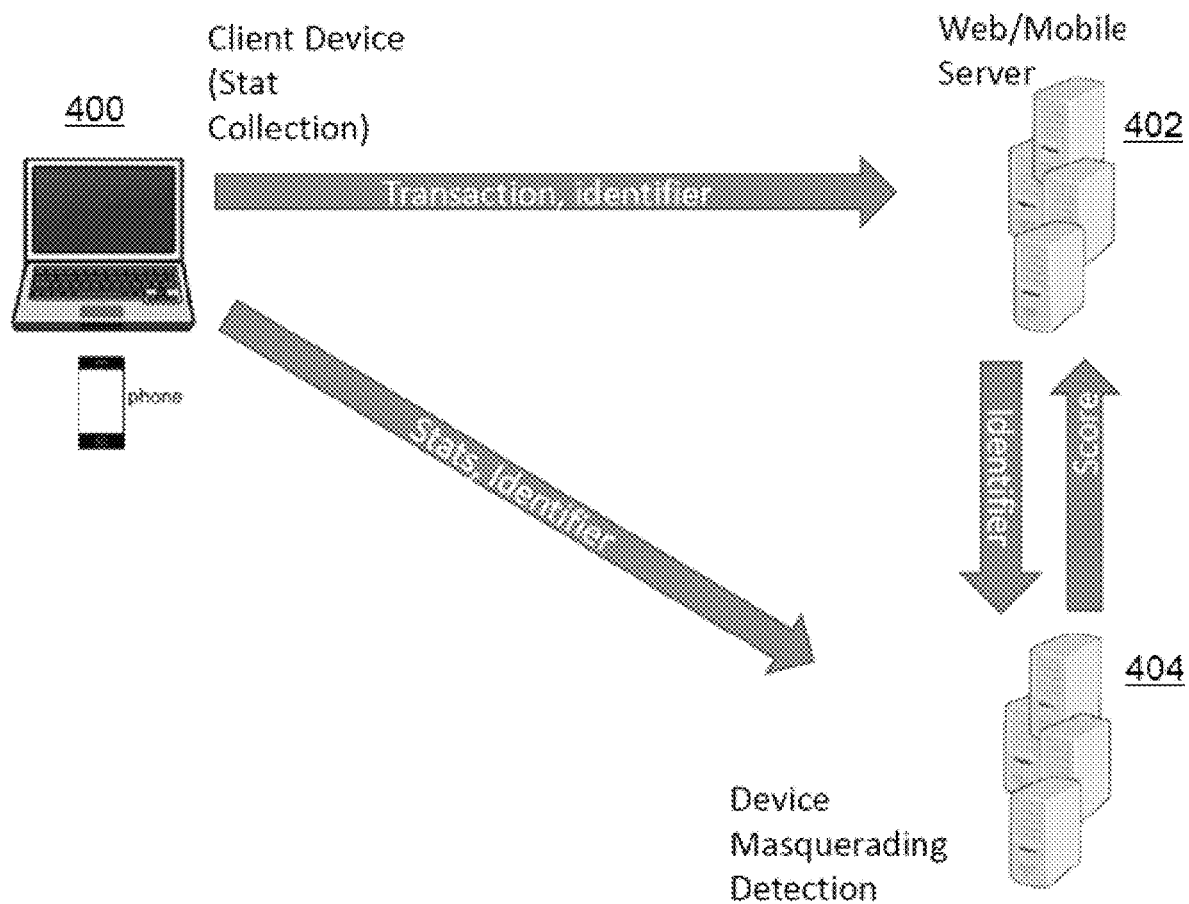
FIG. 4 depicts a third operating embodiment in which the technique is implemented.
Figure 5:
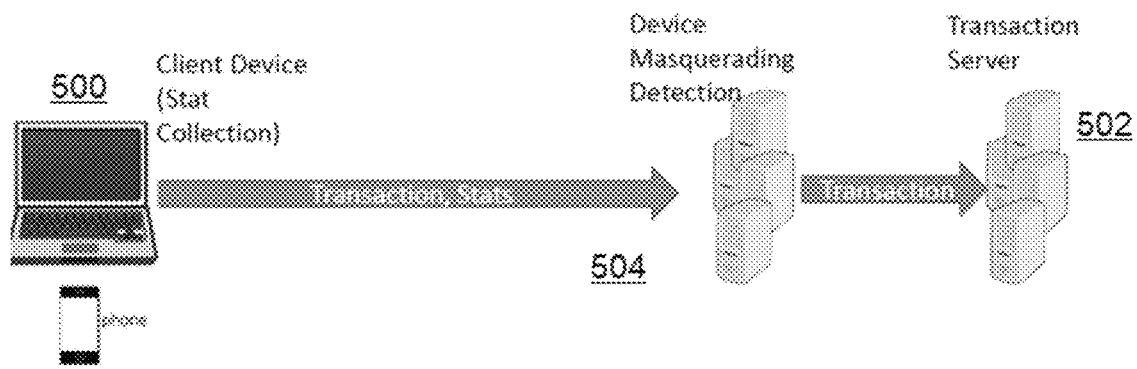
FIG. 5 depicts a fourth operating embodiment.

FIG. 3 depicts an alternative scenario involving three (3) entities, the client device 300, the web/mobile server 302, and a device masquerading detection server 304. In this embodiment, the detection function thus is off-loaded from the API-based server 302 itself. This approach may be useful when it is desired to reduce the computational requirements of the server. Thus, here the statistics are collected on the client 300 and then sent to the web/mobile server 302; server 302 in turn sends the statistics to the device masquerading detection server 304 where they are analyzed. The device masquerading detection server 304 returns a score back to the web/mobile server 302, which in turn preferably does the final transaction approval/rejection.

In FIG. 4, once again there are three (3) entities, namely, the client device 400, the web/mobile server 402, and a device masquerading detection server 404. In this embodiment, the statistics are sent to the device masquerading detection server 404 along with a unique identifier (e.g., session identifier (ID) or some other unique identifier). The device masquerading detection server 404 operates as before and calculates a score. Separately, the transaction details and the unique identifier are sent to the mobile/web server 402. The mobile/web server 402 can query the device masquerading detection server 404 using the unique identifier. When queried in this manner, the device masquerading detection server 404 returns to the server 402 the score associated with the unique identifier. The web/mobile server 402 then authorizes or denies the transaction based on the score returned.

In FIG. 5, once again there are the three entities, namely, the client device 500, the web/mobile server 502, and a device masquerading detection server 504, which is interposed between the client and server. In this embodiment, the statistics collected by the client 500 are sent to the device masquerading detection server 504 along with the transaction. The device masquerading detection server 504 calculates a masquerading score and then determines if the transaction is to be passed on to the final web/mobile server 502. In this embodiment, the scripting information is delivered by the device masquerading detection server (although it may be sourced from the web/mobile server).

Although depicted as a separate device, the device masquerading detection server can be part of a larger system detecting various security threats (such as bots). More generally, device masquerading detector of this disclosure may be implemented as processing logic that may comprises software, firmware, hardware, or any combination thereof.

The device masquerading detection also may rely on additional probabilistic or statistical computational methods, or combinations thereof, including using machine learning-based systems.

The nature of the API interaction is not a limitation of this disclosure Typically, the notion of a transaction here typically refers to one or more actions initiated by the automated script, e.g., an HTTP request for a particular resource, an operation triggered by scripting code, an AJAX request-response interaction, or any other activity initiated from the client and directed to the server.

The techniques herein may be supplemented by other bot mitigation techniques and technologies. Thus, for example, techniques for discriminating human versus automated script behavior are described, for example, in commonly-owned U.S. Pat. No. 9,639,699, titled "Detecting non-human users on computer systems," the disclosure of which is incorporated herein by reference.

Of course, the above describes techniques are merely exemplary.

A given detection score may have a confidence level (or weight) associated therewith. The type of response generated by the transaction server itself may also be based on the confidence level value and its relationship to one or more confidence levels, which levels may be pre-configured or hard-coded.

Enabling Technologies

The techniques herein may be implemented in a computing platform. One or more functions of the computing platform may be implemented conveniently in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

One preferred implementation of the detector is in a managed service such as a content delivery network (CDN) or, more generally, an "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

In a CDN-based implementation, the web/mobile server may be implemented in an edge server, and the device masquerading detection may be a function thereof.

The nomenclature used herein is not intended to be limiting. Thus, the term device masquerading is simply used to define the notion that a client device is posing as another device. Different terms may be used to define the same behavior.

When evaluating the performance statistics collected, the server may be able to detect the actual device type of the requesting client. This may not always be possible, however, in which case the determination made by the server simply is that the device type represented by the requesting client is not correct (i.e., accurate or true). Thus, the determination here may be an actual device type (in which case the comparison to the device type represented by the requesting client is made directly), or the decision may be a negative one, namely, a determination that the device is not what it purports to be (e.g., the device "is not an iPhone®").

What is claimed is as follows:

1. A method to mitigate automated attacks directed to a computing platform environment, comprising:
    responsive to receipt of a request associated with an automated interaction between a requesting client and a server, wherein the request has associated therewith a device type as represented to the server by the requesting client, returning to the requesting client information that manipulates the client to perform client-side computations;
    responsive to receipt during the automated interaction of data collected by the requesting client as a result of performing the client-side computations, determining whether the device type of the requesting client as represented to the server is correct; and
    based on a determination that the device type as represented by the requesting client is not correct, taking a blocking or mitigation action.

2. The method as described in claim 1 wherein the automated interaction is an application programming interface (API) transaction.

3. The method as described in claim 1 wherein the data collected by the requesting client comprise performance statistics.

4. The method as described in claim 3 wherein the performance statistics are statistics regarding a computational efficiency of a central processing unit (CPU) of the requesting client.

5. The method as described in claim 3 wherein determining whether the device type is correct analyzes the performance statistics against a set of expected performance statistics associated with the requesting client.

6. The method as described in claim 1 further including receiving the device type as represented by the client device in a Hypertext Transfer Protocol (HTTP) request header.

7. The method as described in claim 1 wherein the server is one of: a web server, and a mobile server.

8. The method as described in claim 1 wherein the information is a client-side script.

9. A computer program product in a non-transitory computer readable medium comprising computer program instructions executable by a hardware processor and configured to:
    respond to receipt of a request associated with an automated interaction between a requesting client and a server, wherein the request has associated therewith a device type as represented to the server by the requesting client, return to the requesting client information that manipulates the client to perform client-side computations;
    respond to receipt during the automated interaction of data collected by the requesting client as a result of performing the client-side computations, determine whether the device type of the requesting client as represented to the server is correct; and
    based on a determination that the device type as represented by the requesting client is correct, take a blocking or mitigation action.

10. The computer program product as described in claim 9 wherein the automated interaction is an application programming interface (API) transaction.

11. The computer program product as described in claim 9 wherein the data collected by the requesting client comprise performance statistics.

12. The computer program product as described in claim 11 wherein the performance statistics are statistics regarding a computational efficiency of a central processing unit (CPU) of the requesting client.

13. The computer program product as described in claim 11 wherein the computer program instructions configured to determine whether the device type is correct analyze the performance statistics against a set of expected performance statistics associated with the requesting client.

14. The computer program product as described in claim 9 wherein the computer program instructions are executed in an edge server of an overlay network.

15. The method as described in claim 1 wherein determining whether the device type of the requesting client as represented to the server is correct includes identifying a true device type of the requesting client.

16. The computer program product as described in claim 9 wherein the computer program instructions configured to determine whether the device type of the requesting client as represented to the server is correct identify a true device type of the requesting client.

* * * * *